(12) United States Patent
McClung

(10) Patent No.: US 12,091,085 B2
(45) Date of Patent: Sep. 17, 2024

(54) MONITORING A STEERING ANGLE OF A MACHINE

(71) Applicant: Caterpillar Paving Products Inc., Brooklyn Park, MN (US)

(72) Inventor: Travis D. McClung, Las Vegas, NV (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 285 days.

(21) Appl. No.: 17/652,817

(22) Filed: Feb. 28, 2022

(65) Prior Publication Data
US 2023/0271647 A1    Aug. 31, 2023

(51) Int. Cl.
| | | |
|---|---|---|
| B62D 15/02 | (2006.01) | |
| E01C 19/28 | (2006.01) | |
| E02D 3/046 | (2006.01) | |
| G07C 5/02 | (2006.01) | |
| G07C 5/08 | (2006.01) | |

(52) U.S. Cl.
CPC ....... B62D 15/029 (2013.01); B62D 15/0235 (2013.01); E01C 19/282 (2013.01); G07C 5/02 (2013.01); G07C 5/0825 (2013.01); G07C 5/085 (2013.01); E02D 3/046 (2013.01)

(58) Field of Classification Search
CPC . B62D 15/029; B62D 15/0235; E01C 19/282; G07C 5/02; G07C 5/0825; G07C 5/085; E02D 3/046
See application file for complete search history.

(56) References Cited

U.S. PATENT DOCUMENTS

| | | | | | |
|---|---|---|---|---|---|
| D139,172 | S | * | 10/1944 | Beech | D10/74 |
| 4,027,620 | A | * | 6/1977 | Kirsch | G09F 7/00 |
| | | | | | 116/299 |
| 5,194,851 | A | * | 3/1993 | Kraning | B62D 7/1572 |
| | | | | | 340/506 |
| 5,680,099 | A | * | 10/1997 | Springston | B62D 15/02 |
| | | | | | 701/50 |
| 7,731,450 | B2 | | 6/2010 | Congdon et al. | |
| 9,272,715 | B2 | | 3/2016 | Muramatsu et al. | |

(Continued)

FOREIGN PATENT DOCUMENTS

| | | | | |
|---|---|---|---|---|
| CN | 109356003 B | | 2/2019 | |
| JP | 2004155402 A | * | 6/2004 | G07C 5/085 |
| KR | 101927754 B1 | | 11/2018 | |

OTHER PUBLICATIONS

JP-2004155402-A machine translation (Year: 2004).*

*Primary Examiner* — Anshul Sood
*Assistant Examiner* — Oliver Tan

(57) ABSTRACT

In some implementations, a monitoring system may include a steering system of a machine, a sensor configured to detect movements of the steering system that are indicative of a steering angle of the machine, and a controller. The controller may be configured to monitor, via the sensor, the steering angle of the machine. The controller may be configured to determine, based on monitoring the steering angle, that the steering angle satisfies a threshold that is indicative of the steering angle being excessive for an operation of the machine. The controller may be configured to cause, based on the steering angle satisfying the threshold, the machine to provide an indication that the steering angle is excessive.

20 Claims, 4 Drawing Sheets

(56) References Cited

U.S. PATENT DOCUMENTS

| | | | |
|---|---|---|---|
| 10,787,198 B2 | 9/2020 | Oetken | |
| 2005/0234622 A1* | 10/2005 | Pillar | B65F 3/043 |
| | | | 701/41 |
| 2016/0245785 A1* | 8/2016 | Marsolek | E01C 19/48 |
| 2016/0292846 A1* | 10/2016 | Sprock | G06T 7/001 |
| 2019/0106846 A1 | 4/2019 | Marsolek et al. | |
| 2020/0114957 A1* | 4/2020 | Oetken | E01C 19/288 |
| 2020/0114962 A1* | 4/2020 | Oetken | B60W 10/04 |
| 2020/0248433 A1* | 8/2020 | Sharma | E02F 9/2087 |
| 2023/0097927 A1* | 3/2023 | Mashek | E01C 23/088 |
| | | | 299/1.5 |
| 2023/0331249 A1* | 10/2023 | Seeland | B60W 60/001 |

* cited by examiner

MONITORING A STEERING ANGLE OF A MACHINE

TECHNICAL FIELD

The present disclosure relates generally to surface compaction and, for example, to monitoring a steering angle of a machine performing surface compaction.

BACKGROUND

Compaction of a surface material, such as soil or asphalt, can improve strength and stability of the surface. In a paving context, a paving machine distributes hot paving material, such as asphalt, over a surface, and a mobile compactor machine follows the paving machine to compact the material to a desired density and obtain an acceptable surface finish. Commonly, the compactor machine may include one or more compaction drums that serve to propel the compactor machine and compact the paving material via the weight of the compactor machine.

In some cases, during a compaction operation on a surface, an operator may turn the compactor machine too severely when driving onto the surface or driving off of the surface. This may cause the compactor machine to push (e.g., rather than compact) paving material in a manner that forms a bump on the surface. As a result of the bump, the compaction quality of the surface may be deemed unsatisfactory and/or the surface may require repair or re-paving.

China Patent No. 109356003 (the '003 patent) discloses an intelligent rolling system for a roadbed and a pavement that includes a quality detection system, an intelligent decision-making system, an unmanned rolling system, and a remote monitoring center. The '003 patent indicates that the quality detection system is used for continuously acquiring roadbed and pavement compaction quality information in real time. The '003 patent further indicates the compaction quality information includes compaction degree, deflection value, and flatness of a roadbed, and compaction degree, deflection value, flatness, and rolling temperature of a pavement layer. The '003 patent discloses that compaction degree is detected by an integrated sound wave detection technology or an integrated compaction measurement technology, deflection value and flatness are detected by an infrared or laser ranging technology, and rolling temperature is detected by an infrared temperature detection technology.

The system for detecting the quality of a roadbed or pavement disclosed by the '003 patent is complex and employs various complex and costly systems used for quality detection. Moreover, the system of the '003 patent identifies compaction quality issues after such issues have occurred. In other words, the system of the '003 patent is not configured to identify machine operating conditions that may produce poor compaction quality, and to correct such machine operating conditions before poor quality compaction results.

The monitoring system of the present disclosure solves one or more of the problems set forth above and/or other problems in the art.

SUMMARY

A monitoring system may include a steering system of a machine, a sensor configured to detect movements of the steering system that are indicative of a steering angle of the machine, and a controller. The controller may be configured to monitor, via the sensor, the steering angle of the machine; determine, based on monitoring the steering angle, that the steering angle satisfies a threshold that is indicative of the steering angle being excessive for an operation of the machine; and cause, based on the steering angle satisfying the threshold, the machine to provide an indication that the steering angle is excessive.

A method may include monitoring, by a controller and via a sensor of a compactor machine, a steering angle of the compactor machine; causing, by the controller and based on monitoring the steering angle, a representation of the steering angle to be indicated by an indicator of the compactor machine; and causing, by the controller and based on the steering angle satisfying a threshold that is indicative of the steering angle being excessive for a compaction operation of the compactor machine, the representation of the steering angle indicated by the indicator to indicate that the steering angle is excessive.

A compactor machine may include a steering system, a sensor configured to detect movements of the steering system that are indicative of a steering angle of the compactor machine, at least one compaction drum, and a controller. The controller may be configured to: monitor, via the sensor, the steering angle of the compactor machine; determine, based on monitoring the steering angle, that the steering angle satisfies a threshold that is indicative of the steering angle being excessive for a compaction operation of the compactor machine; and cause, based on the steering angle satisfying the threshold, the compactor machine to provide an indication that the steering angle is excessive.

DETAILED DESCRIPTION

This disclosure relates to a monitoring system, which is applicable to any machine that can be controlled by steering.

Figure 1:
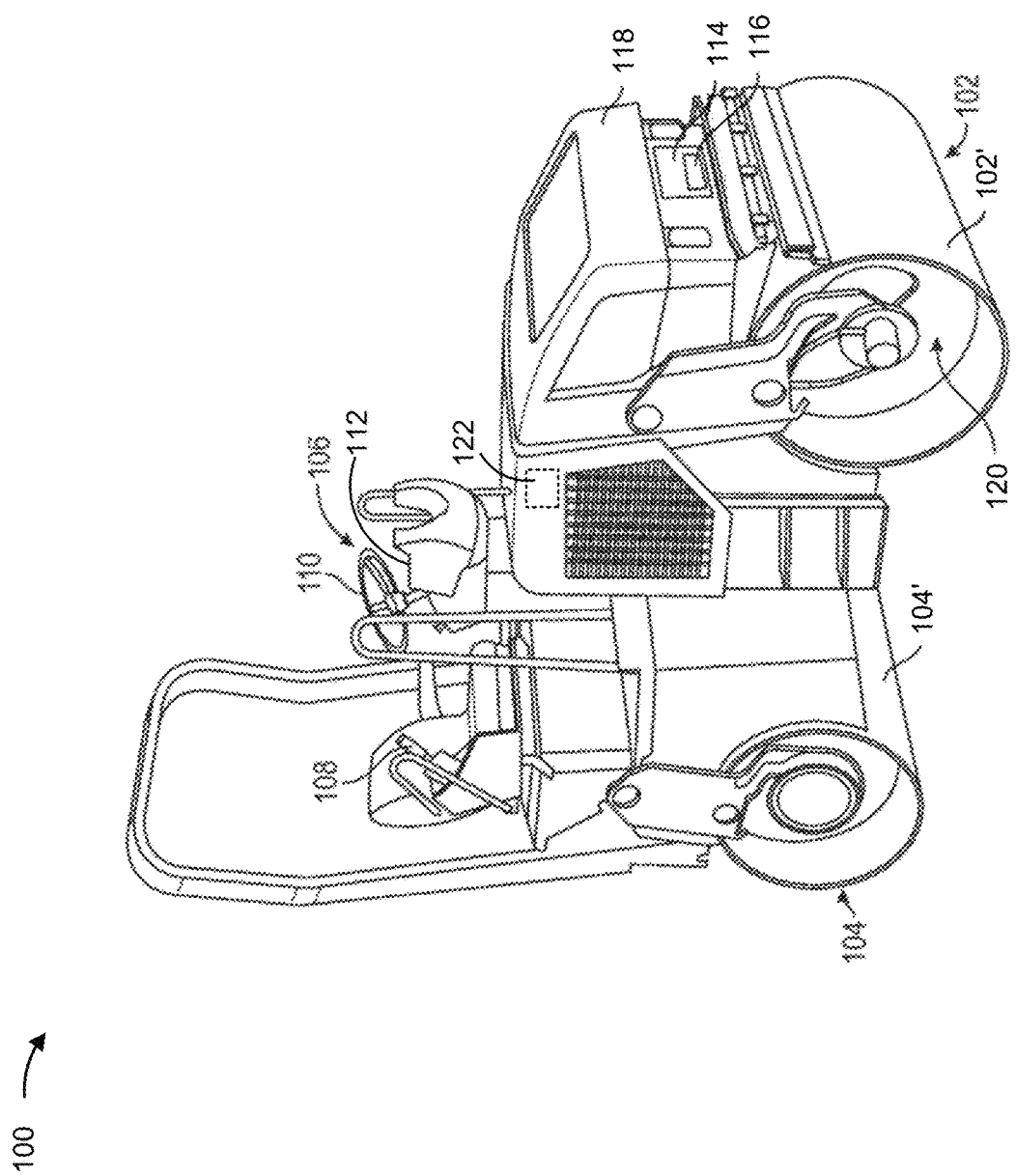
FIG. 1 is a diagram of an example compactor machine described herein.

FIG. 1 is a diagram of an example machine 100 described herein. While in FIG. 1 the machine 100 is depicted as a compactor machine, the machine 100 may be another type of machine, such as a vehicle, a paving machine, a cold planer, a grading machine, a motor grader, or the like. The machine 100 may be an asphalt compactor machine (e.g., a self-propelled, double-drum compactor machine), a vibratory drum compactor machine, or the like, which may be used to compact various materials, such as soil and/or asphalt, among other examples.

The machine 100 has at least one compaction member, such as a compaction drum. For example, as shown, the machine 100 has a front compaction drum 102 and a back compaction drum 104. The compaction drums 102, 104 provide ground engagement of the machine 100 at surfaces 102', 104' of the compaction drums 102, 104, respectively. The surfaces 102', 104' may include cylindrical surfaces that form exteriors of shells of the compaction drums 102, 104, respectively. As the machine 100 passes over a mat of paving material, the surfaces 102', 104' roll against the paving material and provide compaction forces to the paving material due to a weight of the machine 100. One or more of the compaction drums 102, 104 may include a vibratory component configured to cause the compaction drums 102, 104 to vibrate, thereby further facilitating compaction. In some examples, the machine 100 may include one or more other ground engagement members, such as one or more wheels and/or one or more tracks, in addition or alternatively to the front compaction drum 102 or the back compaction drum 104.

The machine 100 includes an operator station 106 equipped with various systems and/or mechanisms for control of the operation of the machine 100. For example, the operator station 106 may include a drive system control 108 (shown as a shift lever) and/or a steering system control 110 (shown as a steering wheel). A steering system of the machine 100 may include the steering system control 110, a steering column (e.g., connected to the steering system control 110), a steering actuator (e.g., a steering cylinder for power steering), and/or a steering linkage assembly (e.g., that connects the steering system control 110 or the steering column to ground engagement members, such as the compaction drums 102, 104, via a plurality of linkage members, such as rods). The operator station 106 may also include a display 112 that provides a graphical user interface for operating the machine 100.

The machine 100 includes an engine 114 and a generator 116 coupled with the engine 114. The engine 114 and the generator 116 are attached to a frame 118 of the machine 100. The generator 116 may serve as an electrical power source for various onboard systems and components of the machine 100. The engine 114 may include any type of engine (e.g., internal combustion, gas, diesel, gaseous fuel, natural gas, propane, or the like). The engine 114 is configured to drive movement of the machine 100 (e.g., via compaction drums 102, 104) and other components of the machine 100, such as the generator 116. In some examples, the engine 114 may include an electric motor. The machine 100 also includes a braking system 120 configured to receive operator input to decrease or arrest a speed of the machine 100.

The machine 100 includes a controller 122 (e.g., an electronic control module (ECM)). The controller 122 may include one or more memories and/or one or more processors that implement various operations of the machine 100, such as operations described in connection with FIG. 2. The controller 122 may be communicatively connected to one or more systems of the machine 100. In some implementations, the controller 122 may provide autonomous control of one or more systems of the machine 100 (e.g., autonomous propulsion, steering, and/or braking).

As indicated above, FIG. 1 is provided as an example. Other examples may differ from what is described in connection with FIG. 1.

Figure 2:
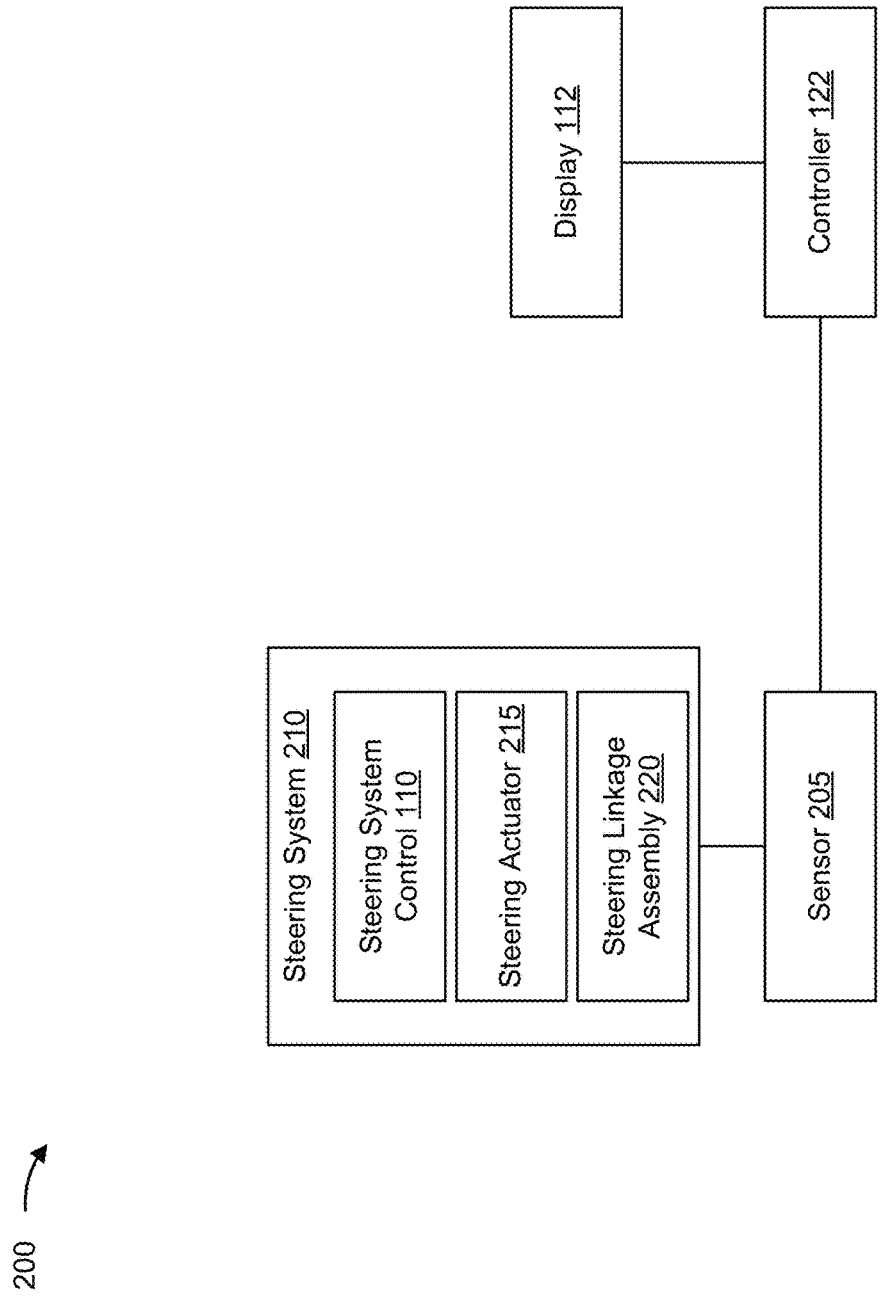
FIG. 2 is a diagram of an example monitoring system described herein.

FIG. 2 shows an example monitoring system 200. The monitoring system 200 may be included in the machine 100. The monitoring system 200 includes the controller 122, the display 112, a sensor 205, and/or a steering system 210. The steering system 210 includes the steering system control 110, a steering actuator 215, and/or a steering linkage assembly 220. As shown in FIG. 2, the controller 122 may be communicatively connected to the sensor 205 and/or the display 112.

The sensor 205 may include one or more sensors configured to detect movements of the steering system 210 (e.g., the steering system control 110, the steering actuator 215, and/or the steering linkage assembly 220) that are indicative of a steering angle of the machine 100. "Steering angle" may refer to an angle of a ground engagement member of the machine 100 relative to a longitudinal axis (e.g., along a direction of travel) of the machine 100. For example, the steering angle may refer to an angle of one or more of the compaction drums 102, 104 (e.g., an angle of the front compaction drum 102, an angle of the back compaction drum 104, or an average angle, a largest angle, or a smallest angle of the compaction drums 102, 104) relative to the longitudinal axis. Movements of the steering system 210 that are indicative of a steering angle of the machine 100 may include rotations of the steering system control 110, rotations of a steering column, displacements of the steering actuator 215, movements of linkage members of the steering linkage assembly 220, movements of articulating sections (e.g., a front portion and a rear portion) of the machine 100, or the like.

The sensor 205 may include a position sensor, a magnetic sensor, an optical sensor, or a combination thereof. In some examples, the sensor 205 may include a non-contact sensor. The sensor 205 may be connected to the steering actuator 215 and/or the steering linkage assembly 220. Additionally, or alternatively, the sensor 205 may be connected to the steering system control 110, a steering column, and/or an articulation joint of the machine 100.

The machine 100 may be employed at a work site. The machine 100 may perform operations associated with compacting paving material at the work site, although operations other than compacting paving material being performed by the machine 100 are also contemplated herein. In one operation associated with compacting paving material, a paving machine may deposit a mat of paving material, and the machine 100 may travel over the mat to compact the mat. The controller 122 of the monitoring system 200 may be configured to perform operations associated with monitoring a steering angle of the machine 100, as described herein.

The controller 122 may detect that the machine 100 is on a surface for which a compaction operation is to be performed. For example, the controller 122 may detect that the machine 100 is on a mat of the paving material (e.g., an asphalt mat). To detect that the machine 100 is on the surface, the controller 122 may obtain information indicating a temperature at a ground-engaging surface (e.g., surface 102' and/or surface 104') of the front compaction drum 102 and/or the rear compaction drum 104 and/or information indicating a level of vibration of the front compaction drum 102 and/or the rear compaction drum 104. The controller 122 may obtain the information via one or more sensors, such as a temperature sensor at surface 102' and/or surface 104' or a vibration sensor (e.g., a piezoelectric accelerometer) of the front compaction drum 102 and/or the rear compaction drum 104. Further, to detect that the machine 100 is on the surface, the controller 122 may determine that information indicating the temperature and/or the information indicating the level of vibration is indicative of the machine 100 being on the surface. For example, a temperature greater than a threshold, such as an ambient air temperature, may indicate that the machine 100 is on the surface. As another example, a level of vibration greater than a threshold, such as a background vibration level of the machine 100, may indicate that the machine is on the surface.

The controller 122 may monitor the steering angle of the machine 100. For example, the controller 122 may monitor the steering angle of the machine 100 based on detecting that the machine 100 is on the surface. The controller 122 may monitoring the steering angle of the machine 100 via the sensor 205. For example, the sensor 205 may generate and provide (e.g., continuously, periodically, aperiodically, or the like) information to the controller 122 that is indicative of the steering angle of the machine 100, and the controller 122 may identify the steering angle of the machine 100 based on the information.

Figure 3:
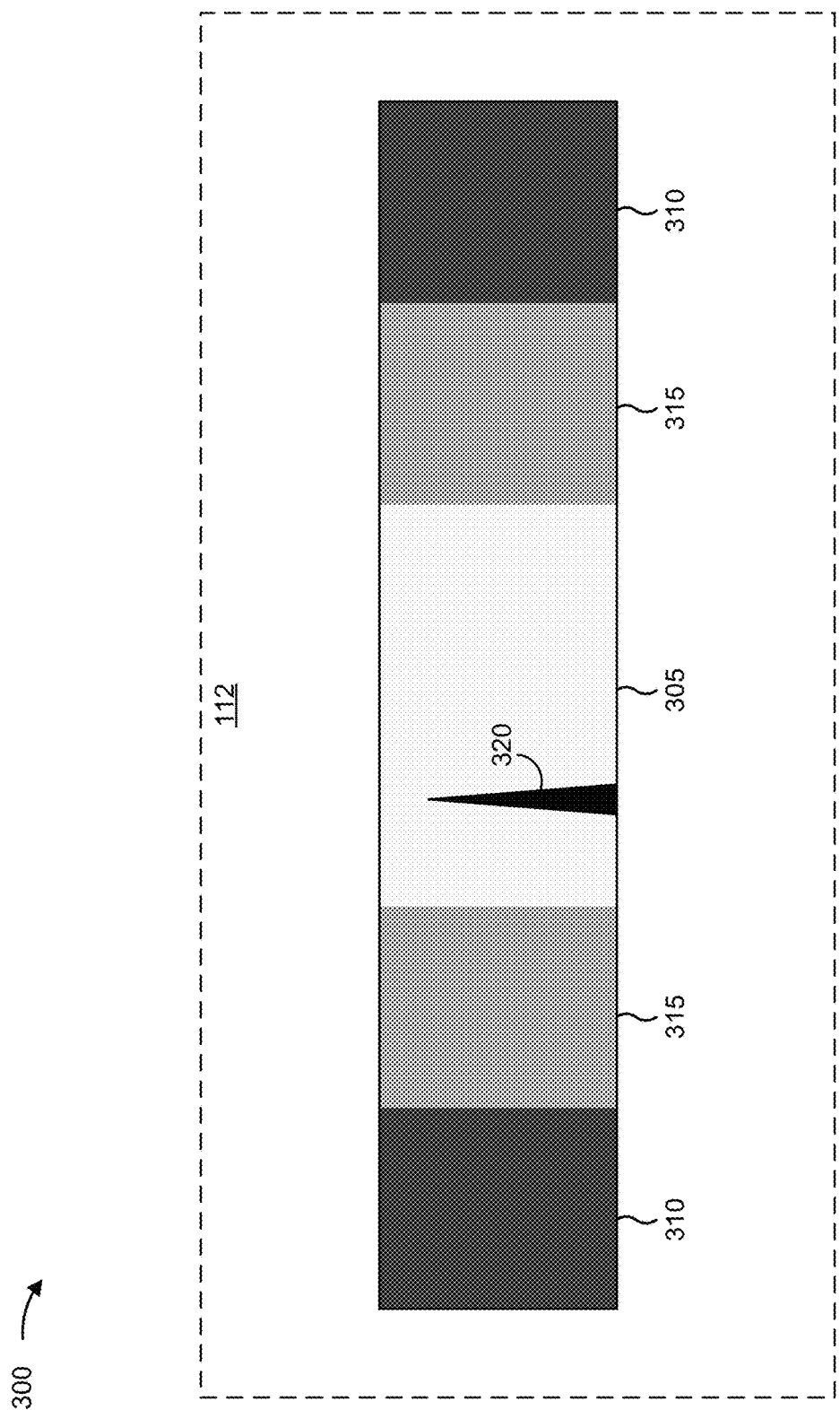
FIG. 3 is a diagram of an example indicator used with the monitoring system described herein.

Based on monitoring the steering angle of the machine 100, the controller 122 may cause a representation of the steering angle to be indicated by an indicator of the machine 100 (e.g., an indicator of the display 112). An example of the indicator and the representation of the steering angle is shown in FIG. 3. The representation of the steering angle of the indicator may provide a real-time indication of the steering angle of the machine 100. For example, the representation of the steering angle of the indicator may provide a real-time indication of whether the steering angle of the machine 100 is excessive.

Furthermore, based on monitoring the steering angle of the machine 100, the controller 122 may determine whether the steering angle satisfies a threshold. The steering angle satisfying the threshold may indicate that the steering angle is excessive (e.g., too sharp, too severe, or the like) for an operation, such as a compaction operation, of the machine 100. For example, the steering angle satisfying the threshold may indicate that the steering angle is likely to result in the machine 100 producing a bump or other irregularity on a surface being compacted.

In some examples, the threshold may be a default value that is configured for the controller 122. The default value may be based on field testing and/or may be an output of a machine learning model, among other examples. The threshold (e.g., the default value) may be adjusted by an operator of the machine 100 based on the particular operating conditions for the machine 100.

In some examples, the controller 122 (e.g., prior to determining whether the steering angle satisfies the threshold) may adjust the threshold (e.g., the default value) based on one or more characteristics of an environment of the machine 100. For example, the controller 122 may adjust the threshold based on a composition of material that is to be compacted (e.g., based on a composition that is detected by the controller 122 or based on information indicating the composition that is configured for the controller 122), a temperature of the material, an ambient temperature, and/or an ambient humidity, among other examples. The controller 122 may determine an adjustment for the threshold using a machine learning model trained to identify the adjustment based on a feature set that includes one or more of the aforementioned characteristics. The controller 122 may adjust the threshold dynamically in real time.

Based on the monitoring the steering angle and determining that the steering angle satisfies the threshold, the controller 122 may cause the machine 100 to provide an indication that the steering angle is excessive. The indication that the steering angle is excessive may alert an operator of the machine 100 to adjust the steering angle to a less severe angle in order to avoid or minimize producing a bump or other irregularity on a surface being compacted. The indication may be a notification on the display 112 indicating that the steering angle is excessive, an audible signal (e.g., a siren) indicating that the steering angle is excessive, and/or haptic feedback (e.g., in the steering system control 110) indicating that the steering angle is excessive, among other examples. Additionally, or alternatively, the indication may be a particular representation of the steering angle that is indicated by the indicator. For example, the indicator may be a gauge, and the indication that the steering angle is excessive may be a particular representation of the steering angle on the gauge, as described in connection with FIG. 3. Thus, to provide the indication, the controller 122 may cause the representation of the steering angle of the indicator to indicate that the steering angle is excessive.

The controller 122 may obtain information indicating a location of the machine 100 at a time when the steering angle satisfies the threshold. For example, the controller 122 may obtain the information indicating the location from a location system of the machine 100 (e.g., a global navigation satellite system (GNSS), a global positioning system (GPS), and/or a real-time kinematic positioning (RTK) system, among other examples). Further, the controller 122 may generate, in a log, an entry that indicates the location of the machine 100 when the steering angle satisfies the threshold. One or more entries in the log may facilitate subsequent identification and remediation of bumps or other irregularities on the surface being compacted. In some examples, the controller 122 may generate a map based on the log and/or may cause the map to be presented on the display 112. In some examples, the controller 122 may transmit the log to another device (e.g., a back-office device) to enable the other device to generate the map.

As indicated above, FIG. 2 is provided as an example. Other examples may differ from what is described in connection with FIG. 2.

FIG. 3 shows an example indicator 300 used with the monitoring system 200. As shown in FIG. 3, the indicator 300 is a gauge, however, other embodiments for the indicator 300 are possible. As further shown in FIG. 3, the indicator 300 may be presented on the display 112 of the machine 100. As described herein, the indicator 300 may provide a representation of the steering angle of the machine 100.

The indicator 300 may include at least one first section 305 associated with a range of acceptable steering angles (e.g., steering angles that are not likely to result in the machine 100 producing a bump or other irregularity on a surface being compacted). The first section(s) 305 of the indicator 300 may be identified by a first particular color (e.g., green), shape, pattern, or the like. The indicator 300 may include at least one second section 310 associated with a range of excessive steering angles (e.g., steering angles that are likely to result in the machine 100 producing a bump or other irregularity on a surface being compacted). The second section(s) 310 of the indicator 300 may be identified by a second particular color (e.g., red), shape, pattern, or the like. In some examples, the indicator 300 may include at least one third section 315 associated with a range of intermediate steering angles that is between the range of acceptable steering angles and the range of excessive steering angles. The third section(s) 315 of the indicator 300 may be identified by a third particular color (e.g., yellow), shape, pattern, or the like.

The range of acceptable steering angles, the range of excessive steering angles, and/or the range of intermediate steering angles may be based on field testing and/or may be an output of a machine learning model, among other examples, as described herein. In some implementations, the controller 122 may dynamically adjust the range of acceptable steering angles, the range of excessive steering angles, and/or the range of intermediate steering angles based on one or more characteristics of an environment of the machine 100, as described herein.

The representation of the steering angle of the machine 100 may be a marker 320 of the indicator 300. The marker 320 may travel (e.g., as caused by the controller 122) in the first section(s), the second section(s), and/or the third section (s) based on the steering angle of the machine 100. For example, the marker 320 being located in the first section(s) 305 indicates that a current steering angle of the machine 100 is acceptable. Continuing with the example, the marker 320 moving closer to, or being located in, the second section(s) 310 indicates that a current steering angle of the machine 100 is becoming excessive or is excessive, thereby indicating that an operator of the machine 100 should adjust the steering angle.

As indicated above, FIG. 3 is provided as an example. Other examples may differ from what is described in connection with FIG. 3.

Figure 4:
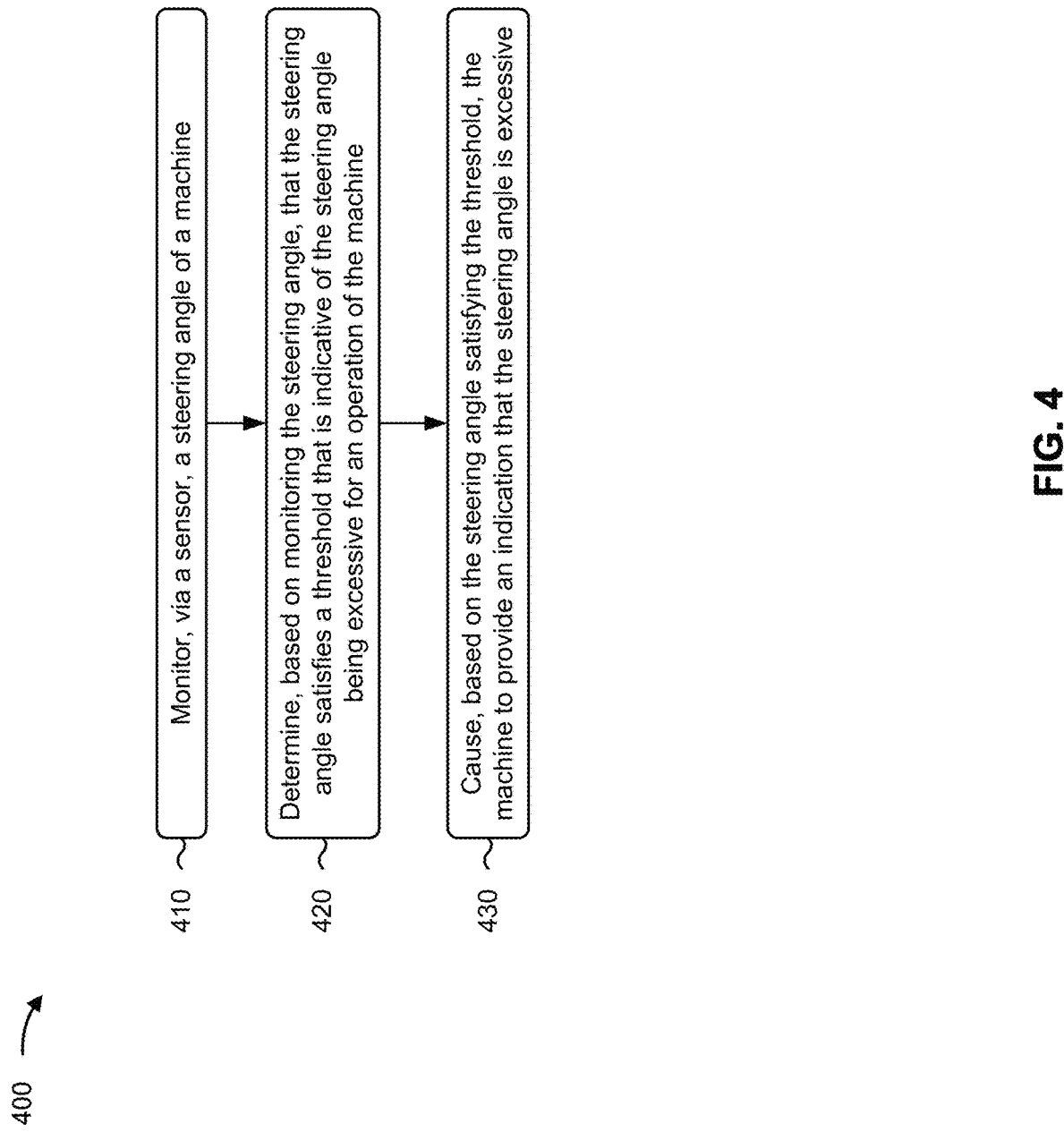
FIG. 4 is a flowchart of an example process relating to monitoring a steering angle of a machine.

FIG. 4 is a flowchart of an example process 400 associated with monitoring a steering angle of a machine. One or more process blocks of FIG. 4 may be performed by a controller (e.g., controller 122). Additionally, or alternatively, one or more process blocks of FIG. 4 may be performed by another device or a group of devices separate from or including the controller, such as another device or component that is internal or external to the machine 100.

As shown in FIG. 4, process 400 may include monitoring, via the sensor, the steering angle of the machine (block 410). For example, the controller (e.g., using a processor, a memory, a communication interface, or the like) may monitor, via the sensor, the steering angle of the machine, as described above. A steering system of the machine may include at least one of a steering actuator or a steering linkage assembly, and the sensor may be configured to detect movements of the at least one of the steering actuator or the steering linkage assembly that are indicative of the steering angle of the machine. The sensor may be a position sensor connected to the steering actuator and/or the steering linkage assembly.

Process 400 may include detecting (e.g., using a processor, a memory, a communication interface, or the like) that the machine is on a surface for which a compaction operation is to be performed, and the steering angle may be monitored based on detecting that the machine is on the surface. Detecting that the machine is on the surface may include obtaining (e.g., using a processor, a memory, a communication interface, or the like), via one or more sensors, at least one of information indicating a temperature at a ground-engaging surface of a compaction drum of the machine or information indicating a level of vibration of the compaction drum, and determining (e.g., using a processor, a memory, or the like) that at least one of the information indicating the temperature or the information indicating the level of vibration is indicative of the machine being on the surface.

Further, process 400 may include causing (e.g., using a processor, a memory, an output component, or the like), based on monitoring the steering angle, a representation of the steering angle to be indicated by an indicator of the machine. The indicator may be a gauge that includes at least one first section associated with a range of acceptable steering angles and at least one second section associated with a range of excessive steering angles. The representation of the steering angle may be a marker that is to travel in the at least one first section and the at least one second section based on the steering angle. The gauge may include at least one third section associated with a range of intermediate steering angles that is between the range of acceptable steering angles and the range of excessive steering angles.

As further shown in FIG. 4, process 400 may include determining, based on monitoring the steering angle, that the steering angle satisfies a threshold that is indicative of the steering angle being excessive for an operation of the machine (block 420). For example, the controller (e.g., using a processor, a memory, or the like) may determine, based on monitoring the steering angle, that the steering angle satisfies a threshold that is indicative of the steering angle being excessive for an operation of the machine, as described above. Process 400 may include adjusting (e.g., using a processor, a memory, or the like) the threshold, prior to determining that the steering angle satisfies the threshold, based on one or more characteristics of an environment of the machine (e.g., a temperature of material to be compacted, an ambient temperature, and/or an ambient humidity).

As further shown in FIG. 4, process 400 may include causing, based on the steering angle satisfying the threshold, the machine to provide an indication that the steering angle is excessive (block 430). For example, the controller (e.g., using a processor, a memory, an output component, a communication interface, or the like) may cause, based on the steering angle satisfying the threshold, the machine to provide an indication that the steering angle is excessive, as described above. The indication that the steering angle is excessive may be a particular representation of the steering angle indicated by the indicator. Additionally, or alternatively, the indication that the steering angle is excessive may be a notification on a display of the machine.

Process 400 may further include obtaining (e.g., using a processor, a memory, a communication interface, or the like), via a location system of the machine, information indicating a location of the machine when the steering angle is determined to satisfy the threshold, and generating (e.g., using a processor, a memory, or the like), in a log, an entry that indicates the location of the machine when the steering angle is determined to satisfy the threshold.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

The monitoring system described herein may be used with any machine (e.g., a compactor machine) having a steering system. In particular, the monitoring system described herein may be used with any machine for which steering is manually controlled by an operator. The monitoring system is useful for preventing, or minimizing adverse effects resulting from, an operator turning a machine at an angle that is too severe. In the context of a compactor machine, the monitoring system is useful for preventing, or minimizing adverse effects resulting from, an operator turning the compactor machine at angle that is likely to result in irregularities (e.g., bumps, ridges, recesses, or the like) in a surface being compacted. For example, the monitoring system may provide an indication to the operator when a steering angle is excessive. In some examples, the indication may be provided via a gauge that provides a real-time representation of the steering angle, thereby allowing the operator to identify when the steering angle is excessive or nearing an excessive angle.

In this way, the monitoring system alerts an operator of a machine when an excessive steering angle is used, thereby facilitating reduction of the excessive steering angle. Accordingly, undesirable effects resulting from the excessive steering angle, such as irregularities in a surface being compacted, may be mitigated or avoided. Thus, the monitoring system facilitates improved compaction operations, and improved quality of a surface resulting from compaction operations.

What is claimed is:

1. A monitoring system, comprising:
a steering system of a compactor machine;
a sensor configured to detect movements of the steering system that are indicative of a steering angle of the compactor machine;
a display including an indicator having a slidable marker; and
a controller configured to:
monitor, via the sensor, the steering angle of the machine;
determine, based on monitoring the steering angle, that the steering angle satisfies a threshold that is indicative of the steering angle being excessive for an operation of the compactor machine and likely to result in the compactor machine producing an irregularity on a surface being compacted; and
cause, based on the steering angle satisfying the threshold, the slidable marker to travel along the indicator to a location that indicates that the steering angle is excessive; and
generate, based on the steering angle satisfying the threshold, an entry in a log that indicates a location of the compactor machine to facilitate identification and remediation of the irregularity on the surface.

2. The monitoring system of claim 1, wherein the controller is further configured to:
obtain, via a location system of the compactor machine, information indicating the location of the compactor machine when the steering angle is determined to satisfy the threshold.

3. The monitoring system of claim 1, wherein the indicator provides a representation of the steering angle.

4. The monitoring system of claim 3, wherein the indicator is a gauge that includes at least one first section associated with a range of acceptable steering angles and at least one second section associated with a range of excessive steering angles, and
wherein the slidable marker is to travel in the at least one first section and the at least one second section based on the steering angle to provide the representation of the steering angle.

5. The monitoring system of claim 1, wherein the controller is further configured to:
adjust the threshold, prior to determining that the steering angle satisfies the threshold, based on one or more characteristics of an environment of the machine.

6. The monitoring system of claim 1, wherein the steering system comprises at least one of a steering actuator or a steering linkage assembly, and
wherein the sensor is configured to detect movements of the at least one of the steering actuator or the steering linkage assembly that are indicative of the steering angle of the compactor machine.

7. The monitoring system of claim 1, wherein the steering angle is an angle of a ground engagement member of the compactor machine relative to a longitudinal axis of the compactor machine.

8. A method, comprising:
monitoring, by a controller and via a sensor of a compactor machine, a steering angle of the compactor machine;
determining, by the controller and based on monitoring the steering angle, that the steering angle satisfies a threshold that is indicative of the steering angle being excessive for an operation of the compaction machine and likely to result in the compactor machine producing an irregularity on a surface being compacted;
causing, by the controller and based on the steering angle satisfying the threshold, a slidable marker to travel along an indicator of a display to a location that indicates that the steering angle is excessive,
wherein the slidable marker provides a representation of the steering angle; and
generating, by the controller, an entry in a log that indicates a location of the compactor machine to facilitate identification and remediation of the irregularity on the surface.

9. The method of claim 8, further comprising:
obtaining, via a location system of the compactor machine, information indicating the location of the compactor machine when the steering angle satisfies the threshold.

10. The method of claim 8, further comprising:
detecting that the compactor machine is on the surface,
wherein the steering angle of the compactor machine is monitored based on detecting that the compactor machine is on the surface.

11. The method of claim 10, wherein detecting that the compactor machine is on the surface comprises:
obtaining, via one or more sensors, at least one of information indicating a temperature at a ground-engaging surface of a compaction drum of the compactor machine or information indicating a level of vibration of the compaction drum; and
determining that at least one of the information indicating the temperature or the information indicating the level of vibration is indicative of the compactor machine being on the surface.

12. The method of claim 8, further comprising:
adjusting the threshold based on one or more of a composition of material that is to be compacted by the compactor marchine, a temperature of the material, an ambient temperature, or an ambient humidity.

13. The method of claim 8, wherein the indicator is a gauge that includes at least one first section associated with a range of acceptable steering angles and at least one second section associated with a range of excessive steering angles, and
wherein the slidable marker is to travel in the at least one first section and the at least one second section based on the steering angle.

14. The method of claim 13, wherein the gauge includes at least one third section associated with a range of intermediate steering angles that is between the range of acceptable steering angles and the range of excessive steering angles.

15. A compactor machine, comprising:
a steering system;
a sensor configured to detect movements of the steering system that are indicative of a steering angle of the compactor machine;
at least one compaction drum;
a display including an indicator having a slidable marker,
wherein the indicator provides a representation of the steering angle; and
a controller configured to:
monitor, via the sensor, the steering angle of the compactor machine;
determine, based on monitoring the steering angle, that the steering angle satisfies a threshold that is indicative of the steering angle being excessive for a compaction operation of the compactor machine and likely to result in the compactor machine producing an irregularity on a surface being compacted;

cause, based on the steering angle satisfying the threshold, the slidable marker to travel along the indicator to a location that indicates that the steering angle is excessive; and generate, based on the steering angle satisfying the threshold, an entry in a log that indicates a location of the compactor machine to facilitate identification and remediation of the irregularity on the surface.

16. The compactor machine of claim 15, wherein the sensor is a position sensor connected to a steering actuator of the steering system.

17. The compactor machine of claim 15, wherein the sensor is a position sensor connected to a steering linkage assembly of the steering system.

18. The compactor machine of claim 15, wherein the controller is further configured to:

obtain, via a location system of the compactor machine, information indicating the location of the compactor machine when the steering angle is determined to satisfy the threshold.

19. The compactor machine of claim 15, wherein the controller is further configured to:

detect that the compactor machine is on the surface,
wherein the steering angle of the compactor machine is monitored based on detecting that the compactor machine is on the surface.

20. The compactor machine of claim 15, wherein the steering angle is an angle of the at least one compaction drum relative to a longitudinal axis of the compactor machine.

* * * * *